United States Patent
Plenderleith

(10) Patent No.: US 10,824,641 B1
(45) Date of Patent: Nov. 3, 2020

(54) DETERMINISTIC QUERY-BASED REPLICATION

(71) Applicant: Amazon Technologies, Inc., Seattle, WA (US)

(72) Inventor: Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 659 days.

(21) Appl. No.: 15/184,927

(22) Filed: Jun. 16, 2016

(51) Int. Cl.
*G06F 16/27* (2019.01)
*G06F 16/242* (2019.01)

(52) U.S. Cl.
CPC .......... *G06F 16/27* (2019.01); *G06F 16/2425* (2019.01)

(58) Field of Classification Search
CPC . G06F 17/30575; G06F 16/27; G06F 16/2425
See application file for complete search history.

(56) References Cited

U.S. PATENT DOCUMENTS

| | | | | |
|---|---|---|---|---|
| 5,913,214 A * | 6/1999 | Madnick | ........... | G06F 17/30427 |
| 2005/0154709 A1 * | 7/2005 | Barsness | ........... | G06F 17/30979 |
| 2010/0094854 A1 * | 4/2010 | Rouhani-Kalleh | .......................... | G06F 17/30646 707/706 |
| 2010/0191720 A1 * | 7/2010 | Al-Omari | ......... | G06F 17/30463 707/718 |
| 2010/0306188 A1 * | 12/2010 | Cunningham | .... | G06F 16/24542 707/713 |
| 2012/0054533 A1 * | 3/2012 | Shi | ....................... | G06F 11/2094 714/4.1 |
| 2012/0158765 A1 * | 6/2012 | Kumar | .............. | G06F 17/30646 707/766 |
| 2014/0129493 A1 * | 5/2014 | Leopold | .................. | G06F 19/32 706/12 |
| 2015/0324440 A1 * | 11/2015 | Subramanian | .... | G06F 17/30598 707/694 |
| 2016/0132572 A1 * | 5/2016 | Chang | ............... | G06F 17/30569 707/723 |
| 2016/0292226 A1 * | 10/2016 | Konik | ..................... | G06F 16/25 |
| 2017/0116206 A1 * | 4/2017 | Gumerato | ......... | G06F 17/30581 |
| 2018/0013692 A1 * | 1/2018 | Park | ........................ | H04L 67/22 |

\* cited by examiner

*Primary Examiner* — Cam Y T Truong
(74) *Attorney, Agent, or Firm* — Davis Wright Tremaine LLP

(57) ABSTRACT

A first database may receive a query comprising a first portion associated with a non-deterministic result. The first non-deterministic portion of the query may be mapped to a second deterministic portion. A second, deterministic query may be formed by replacing the first portion with the second portion. The second version of the query may be executed on the first database, causing the first database to transition from a first state to a second state. The second query may be executed on a second database in the first state, causing the second database to transition to a state equivalent to the second state of the first database.

19 Claims, 10 Drawing Sheets

DETERMINISTIC QUERY-BASED REPLICATION

BACKGROUND

Data replication generally involves the transference of state between computing nodes. In a distributed database system, for example, the system may copy data between nodes in order to increase the accessibility and reliability of the data. In some instances, queries executed on a "master" node may result in changes to the data, which are then propagated to one or more destination nodes. A variety of replication techniques may be employed, such as storage-level replication and log-based replication. Storage-level replication may involve copying data between nodes using the file system, block-level data transfer, disk mirroring, or other such mechanisms. Log-based replication, on the other hand, may involve transferring and reapplying the master node's transaction log. The transaction log may contain a record of each change applied by the master while processing a query, such that the changes may be reapplied to a destination node without needing to re-process the original query.

In some instances, however, replication may be performed by re-processing the original query on the destination node. One drawback to this approach is that not all database queries are deterministic and, consequently, the states of the master and destination nodes may not be equivalent after executing the query on the destination node, even when the master and destination nodes are initially in an equivalent state.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
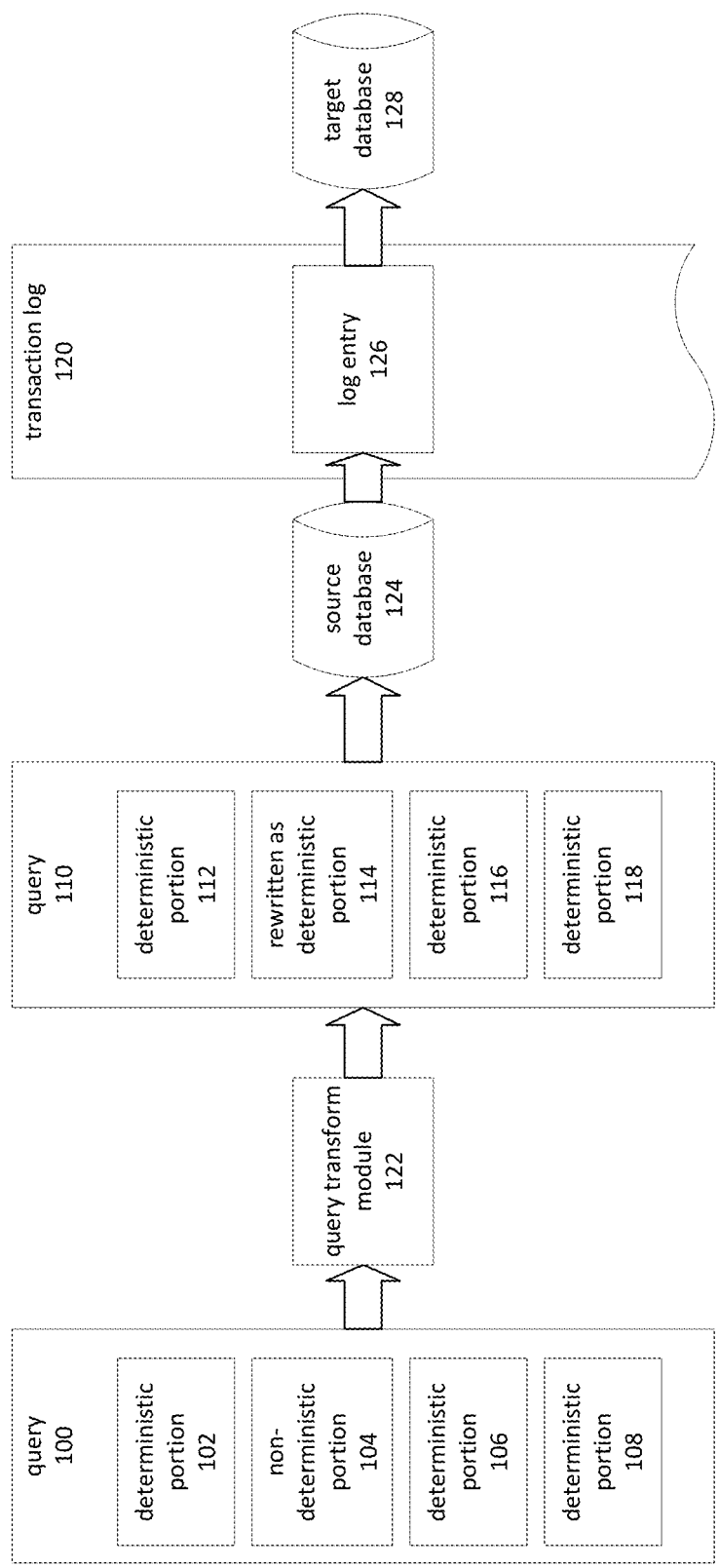
FIG. 1 is a block diagram depicting an example database system in which a non-deterministic query portion is replaced with a deterministic portion.

Disclosed herein are systems, methods, and computer program products pertaining to database operations, including database replication and diagnostics. In conventional database systems, replication and diagnostic functions may be complicated by non-determinism, which refers to the tendency of some database operations to produce results that vary over time, even given a constant initial state. As disclosed herein, a database system may receive a query with a non-deterministic portion, form a new version of the query by replacing the non-deterministic portion with a corresponding deterministic portion, and execute the new version of the query. The new version of the query may produce a result that is functionally equivalent to the original query, but that produces consistent results over time, given a constant initial state. The new version of the query may therefore be replayed on other database systems to replicate database state with greater consistency than may typically be achieved with conventional replication techniques.

In an example embodiment, a distributed database system may include a first database node and a second database node. An additional computing node, which may coincide with the first or second database nodes, may perform operations for replicating data. The operations may comprise receiving a database query and identifying a portion of the query which would, upon execution, be associated with a non-deterministic result. The portion of the query may, for example, be a function whose result is non-deterministic and which, consequently, is associated with a non-deterministic result of executing the query. The computing node may perform further operations which select a mapping that corresponds to the identified, non-deterministic portion of the query. The mapping may include information which is indicative of a replacement for the portion of the query. For example, the mapping may link to information providing a template usable to replace the non-deterministic portion of the query with a deterministic portion. Using the mapping, the computing node may form a version of the query which may be deterministic, or at least suitably deterministic. The new version of the query may be formed by replacing the identified, non-deterministic portion of the query with a new portion obtained using the selected mapping. The new portion of the query may be deterministic, and consequently the new version of the query may also be deterministic.

The computing node may then cause the new version of the query to be executed on the first database node. Executing the new version of the query may cause the first database node to transition from a first state to a second state. For example, rows in a table maintained by the first database node may be updated. A record indicative of executing the new version of the query may be saved on a storage device. The record may, for example, be stored in a transaction log. The record may be used to subsequently replay the new version of the query on the second database node. The second database node may, prior to replaying the query, be in a state equivalent to the first state of the first database node. Subsequent to replaying the new version of the query, the second database node may transition to a state that is equivalent to the second state of the first database. Note that the equivalency of the states, subsequent to the replay, is greater than that which would typically be achieved by replaying the original, non-deterministic query.

In various embodiments disclosed herein, replacement of non-deterministic query portions with deterministic query portions, using the techniques described herein, may permit a query to be re-executed at various times and locations, while the result of the execution remains constant. Similar, in various embodiments, an input query containing non-deterministic portions may nevertheless produce consistent output each time the same input query is run.

FIG. 1 is a block diagram depicting an example database system in which a non-deterministic query portion is replaced with a deterministic portion. A query 100 may comprise various portions 102-108, such as statements, clauses, functions, keywords, and so forth. Certain portions 102, 106, 108 of the query 100 may be deterministic, such that execution of these portions, given a particular prior state of the source database 124, will produce the same result independent of factors external to the prior state of the source database 124. For example, a function such as SUBSTRING(str, pos, len) will produce the same result given the same set of inputs, and as such is considered to be deterministic. The query 100 may also contain a non-deterministic portion 104. These may include statements, clauses, functions, keywords and so forth that produce non-deterministic results. Given a particular prior state of the source database 124, the non-deterministic portion 104 may not necessarily produce the same result. For example, a function such as GETDATE( ) may return a different value each time it is executed, regardless of the particular state of the source database 124.

A query transform module 122 may form non-deterministic queries based on deterministic queries. For example, the query 100 may be described as non-deterministic based on the presence of the non-deterministic portion 104, since the overall result of the query 100 may depend on a non-deterministic outcome of executing the non-deterministic portion 104. The query transform module 122 may analyze the query 100 to identify portions 102, 106, 108 of the query 100 that are deterministic, and the portion 104 that is non-deterministic. The query transform module 122 may then form query 110 comprising the deterministic portions 112, 116, 118 corresponding to the deterministic portions 102, 106, 108 in query 100, and a rewritten deterministic portion 114 corresponding to the non-deterministic portion 104 in the query 100.

The rewritten query 110 may be executed on source database 124 in place of of the original query 100. Information indicative of the rewritten query 110 may be stored, for example, in a transaction log 120. In some instances, the information may be stored in another destination, such as a trace log (not shown). In the example of FIG. 1, information about the deterministic query 110 may be stored in log entry 126 within transaction log 120.

Using this information, the query 110 may be replayed on a target database 128. In an example, the initial state of target database 128 may correspond to the initial state of source database 124, prior to the execution of the rewritten query 110. This being the case, when the query 110 is replayed (e.g., executed) on target database 128, the resultant state of target database 128 may be equivalent to the resultant state of source database 128 following the execution of the query 110.

Note that if the original non-deterministic query 100 were executed on target database 128, the resultant state of the target database 128 might be different than the resultant state of source database 124, even given each of the databases 124, 128 having an equivalent initial state. For example, if the non-deterministic portion 104 of query 100 comprised a GETDATE( ) function, the value of which was inserted into a column of a row, the corresponding row in each the of databases 124, 128 might have a different value, depending on when the query 100 was executed on the replayed on the target database 128. In contrast, by executing the rewritten, deterministic query 110 the resultant state of the databases 124 may be equivalent.

Figure 2:
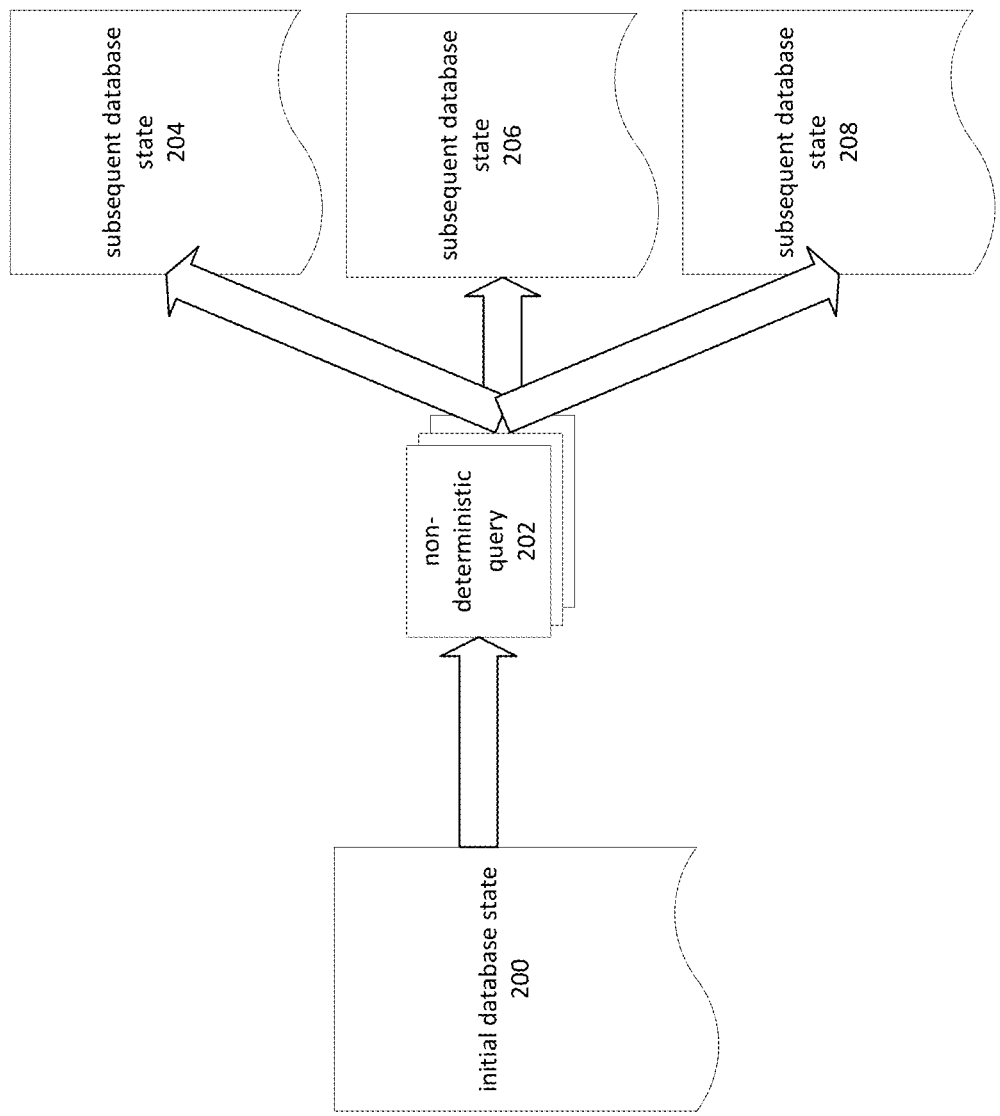
FIG. 2 is a block diagram depicting application of a non-deterministic query to a database having an initial state.
Figure 3:
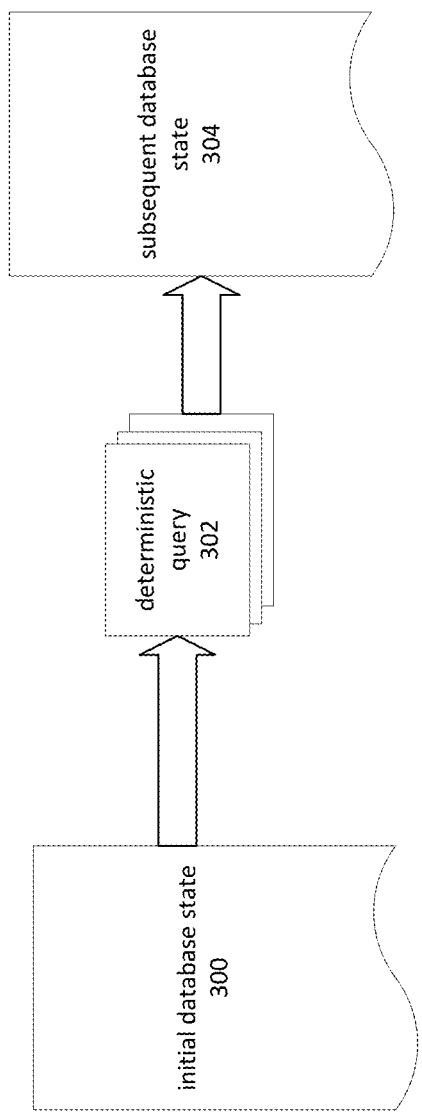
FIG. 3 is a block diagram depicting application of a deterministic query to a database having an initial state.

This may be further understood with reference to FIG. 2, which is a block diagram depicting application of non-deterministic queries to a database having an initial state, and to FIG. 3, which is a block diagram depicting application of deterministic queries to a database having an initial state.

FIG. 2 depicts a non-deterministic query 202 which may be executed on a database (not shown) having an initial database state 200. In the example of FIG. 2, the non-deterministic query 202 is executed repeatedly against the same initial database state. Because the query 202 is non-deterministic, each execution of the query 202 to a database having the same initial database state 200 may result in a database having a different subsequent database state 206. For example, if an initial state is referred to as $S_{initial}$, and applying a query comprising a non-deterministic portion results in a subsequent state $S_1$, applying the same query to the same $S_{initial}$ state might result in a subsequent database $S_2$ which is not equivalent to $S_1$.

FIG. 3 depicts a deterministic query 302 which may be executed on a database (not shown) having an initial database state 300. The deterministic query 302 may be executed repeatedly against the same initial database state 300. Here, because the query 302 is deterministic, a single subsequent database state 304 is generated each time the deterministic query 302 is applied to the same initial database state. For example, each application of the deterministic query 302 to $S_{initial}$ would result in the same resultant database state $S_{subsequent}$.

The query transform module 122 depicted in FIG. 1 may utilize various techniques for rewriting a non-deterministic query to a deterministic query. In an example, the query transform module 122 parses the non-deterministic query and compares clauses, statements, functions, and keywords found in the query to a list of query elements identified as non-deterministic or potentially non-deterministic. The portions of the query that have been identified as non-deterministic may be mapped to information indicating how a non-deterministic portion of a query might be replaced with a deterministic portion.

Figure 4:
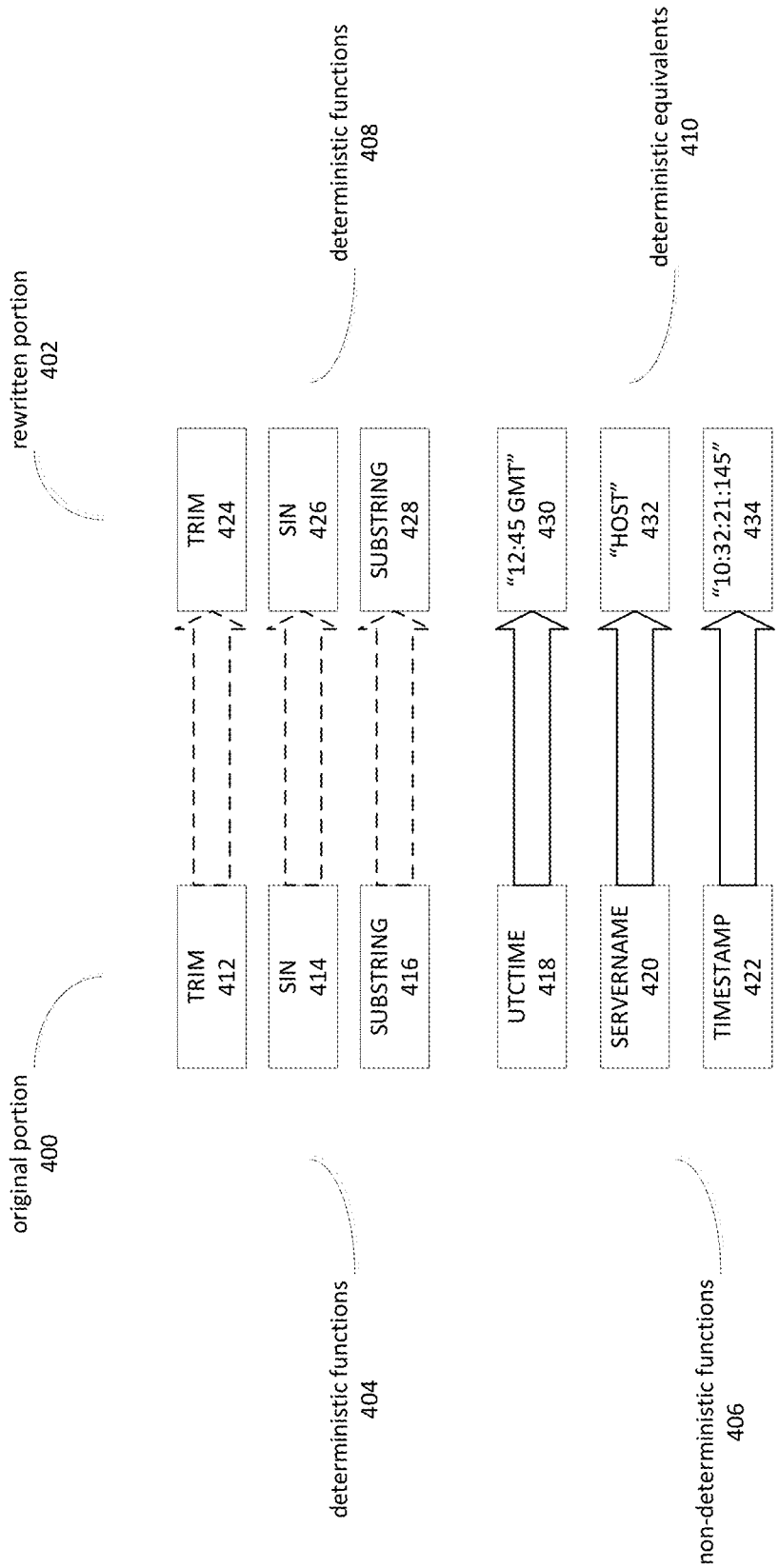
FIG. 4 is a block diagram depicting examples of deterministic and non-deterministic functions and examples of mapping to deterministic functions.

FIG. 4 is a block diagram depicting examples of deterministic and non-deterministic functions and examples of mapping to deterministic functions. As depicted by FIG. 4, certain functions may be classified as deterministic functions 404 because, given a certain input state, the produce a certain output regardless of factors external to the input state, such as when the function is called. For example, functions such as TRIM 412, SIN 414, and SUBSTRING 416 may be treated as deterministic. For example, a call to TRIM("ABC_") will always result in "ABC" regardless of how many times the call was made, or when the calls were made.

When an original portion 400 of a query comprises one of these functions 412, 414, 416, the rewritten query may contain the same functions 424, 424, 428. For example, a query containing the TRIM 412 function may, when rewritten, contain an equivalent TRIM 424 function. In some instances, deterministic functions are included "as-is" in the rewritten query. In other words, deterministic functions may be left in place in their original form in the rewritten portion 402.

Other functions, such as UTCTIME 418, SERVERNAME 420, and TIMESTAMP 422 may be identified as being non-deterministic functions 406. For example, UTCTIME 418 might return "12:45:15" the first time it is called and "12:55:32" the next time. TIMESTAMP 422 might behave similarly. Likewise, the output of SERVERNAME 420 might depend on which server processes the function.

The non-deterministic functions 406 may be mapped to deterministic equivalents 410. In some instances, the equivalents may be constant values determined through one of a number of possible techniques. For example, the non-deterministic function UTCTIME 418 might be replaced in the rewritten portion 402 by "12:45 GMT" 430. The value might be selected by the current UTCTIME when the mapping occurs. Likewise, a call to the non-deterministic SERVERNAME 420 function might be replaced by the fixed constant "HOSTNAME." In some cases, a variable name or other marker may be provided as the constant value, to allow for an alternative value to be substituted at a later time.

A mapping may be supplied to provide a correspondence between non-deterministic functions and replacement values and or replacement techniques. For example, the function UTCTIME 418 might be mapped to information that indicates that a constant time value should be obtained by invoking the UTCTIME function on a target database and using the result to form the rewritten portion 402. In another example, the SERVERNAME 420 function might be mapped directly to a constant value "HOST" 432.

Figure 5:
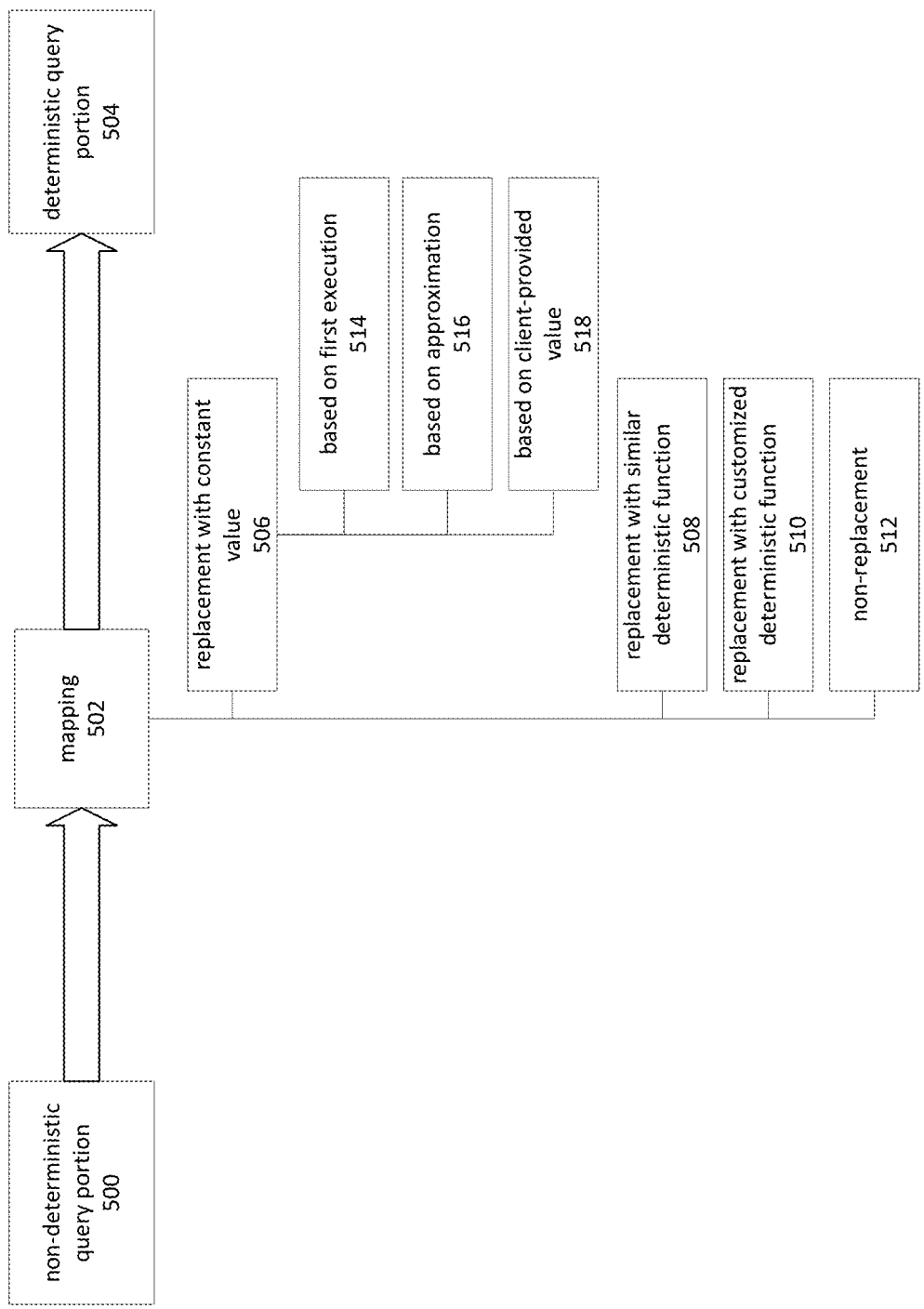
FIG. 5 is a block diagram depicting examples of replacement of non-deterministic query portions.

FIG. 5 is a block diagram depicting examples of replacement of non-deterministic query portions. The query transform module 122 may identify a replacement strategy using a mapping 502 that relates a non-deterministic query portion 500 to a replacement strategy 506-512. The query transform module 122 may then use a selected replacement strategy 506-512 to form a deterministic query portion 504 that corresponds to the non-deterministic query portion 500.

In some instances, the non-deterministic query portion 500 may be mapped to a replacement strategy 506 indicating that the non-deterministic portion 500 should be replaced with a constant value. In some instances, various additional strategies 514-518 may be employed to obtain the particular constant value to be used. In an example, a strategy 513 may indicate that the value obtained by a first execution of the non-deterministic portion 500 should be used to form the corresponding deterministic query portion 504. In some instances, the non-deterministic portion 500 may be executed separately. For example, if the non-deterministic portion 500 was the function UTCTIME, a statement such as "select UTCTIME" might be executed to obtain a constant value usable to form the deterministic query portion 504.

In some instances, a strategy 516 might be employed to form the constant value based on an approximation of what would typically be returned by the function. The approximation may also reflect factors such as the environment in which the query is to be executed, when the query is expected to be replayed on another server, and so forth. For example, if a query is to be executed on each of a cluster of databases within a one-hour timeframe, the constant value used as a deterministic substitute for a UTCTIME invocation might be a string representing a time midway between the current time and one hour subsequent to the current time.

In some instances, customized substitutions might be used based on a strategy 518 in which a client of the database provides a suitable constant value. For example, where a query is to be executed and replayed on a cluster of database servers, the client might provide a name for the cluster to be used as a deterministic substitute for GETSERVERNAME invocations.

In some instances, the non-deterministic query portion may be replaced according to a strategy 510 in which a non-deterministic function is replaced with another function. The replacement function may be deterministic, or at least suitably deterministic. For example, a function returning the current time accurate to a millisecond might be replaced by a function that returns the current time accurate to the minute. This replacement might be suitably deterministic if all executions of the rewritten query are to be performed within a one-minute timeframe. The foregoing example may, therefore, involve substituting a non-deterministic function with a function that is deterministic within a range of tolerance.

In some instances, the non-deterministic query portion 500 may be replaced with a custom function according to a strategy 510. The replacement function may be provided by a client of the database. Typically, the replacement function will be non-deterministic or suitable non-deterministic.

In some cases, a replacement function may operate as the original non-deterministic function unless placed in a "deterministic mode." For example, a UTCTIME function invocation might be replaced by another function returns the current UTC time unless a configuration switch is activated, after which the function returns a constant value.

In some instances, the non-deterministic query portion 500 may, according to a strategy 512, not be replaced with a deterministic query portion 504. This might be the case, for example, when a non-deterministic function is being used to generate information for tracing or debugging, but not for an operational purpose. Thus, some portions of a query might be rewritten to eliminate non-determinism pertaining to an operational role, while not eliminating non-determinism related to purposes such as debugging.

Figure 6:
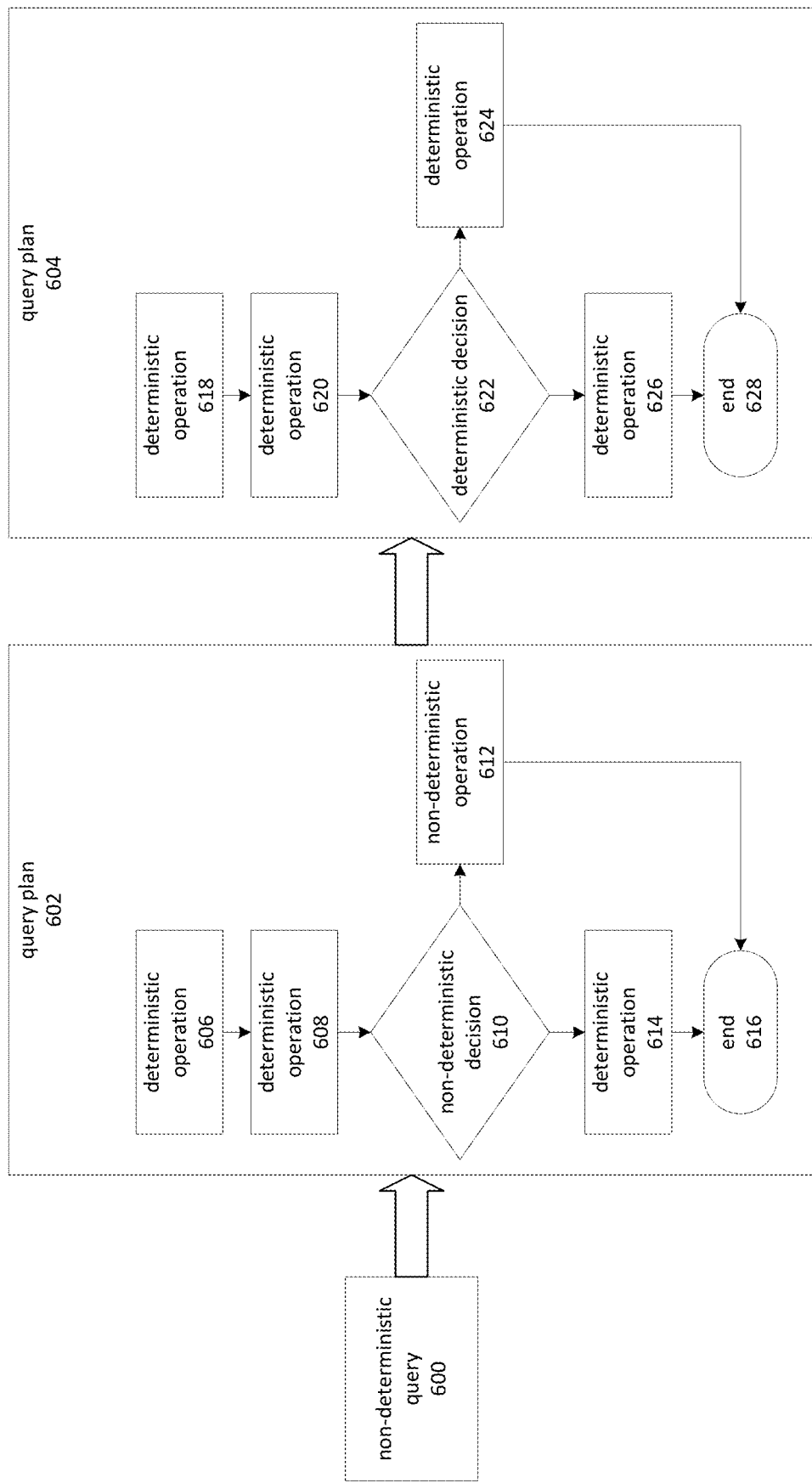
FIG. 6 depicts an example of rewriting query plans to remove a non-deterministic operation.

FIG. 6 depicts an example of rewriting query plans to remove a non-deterministic operation. In the example of FIG. 6, a query transform module transforms a non-deterministic query plan 602 into a deterministic query plan 604. In this example, the query transform module may integrate with or be part of a database module such as a query analyzer or query execution engine.

A non-deterministic query 600 may be provided to a query analyzer, which may construct an initial query plan 602. The initial query plan 602 may comprise instructions for executing the non-deterministic query 600. Examples of such instructions including scanning partitions and indexes, joining results, applying filters, and so forth. In FIG. 6, these operations are depicted as deterministic operations 606, 608, 614 and non-deterministic operations 610, 612. The non-deterministic operations 610, 612 may include, for example, instructions to invoke functions or operators with non-deterministic results. For example, the non-deterministic operation 610 might include instructions to obtain values such as a random number, the current time, the current central-processing unit ("CPU") utilization, and so forth. The non-deterministic operations 610, 612 may also include, in some instances, a non-deterministic decision 610. The non-deterministic decision 610 may comprise a branch or loop operator whose outcome is dependent upon some non-deterministic factor, such as the return value of a non-deterministic function. In an example, a CASE expression in a SQL statement might be dependent on a function that returns the current day of the week. The entire expression might therefore be considered to be non-deterministic, since its output depends on the day of the week rather than the current state of the database.

A deterministic query plan 604 may be created based on the non-deterministic query plan 602. In some instances, the deterministic query plan 604 may have some level of acceptable non-determinism, for example by having non-deterministic results confined to non-operational data such as debugging information.

The deterministic query plan 604 may be created by replacing certain operations with other operations. For example, deterministic operations in the query plan 602 may be replaced with deterministic operations in the deterministic query plan 604. For example, the non-deterministic operation 612 in query plan 602 may be replaced by a deterministic operation 624 in query plan 604. Similarly, the non-deterministic decision 610 may be replaced by a deterministic decision 622.

In some instances, a query transform module may be integrated with a query optimizer stage of a database system, such that in the initial stages of optimization (i.e. after formation of the query plan but prior to optimization stages that may benefit from deterministic assumptions), the query plan may be updated to replace non-deterministic operations with deterministic operations, such as an operation to reference a constant value in lieu of invoking a non-determinist function.

Figure 7:
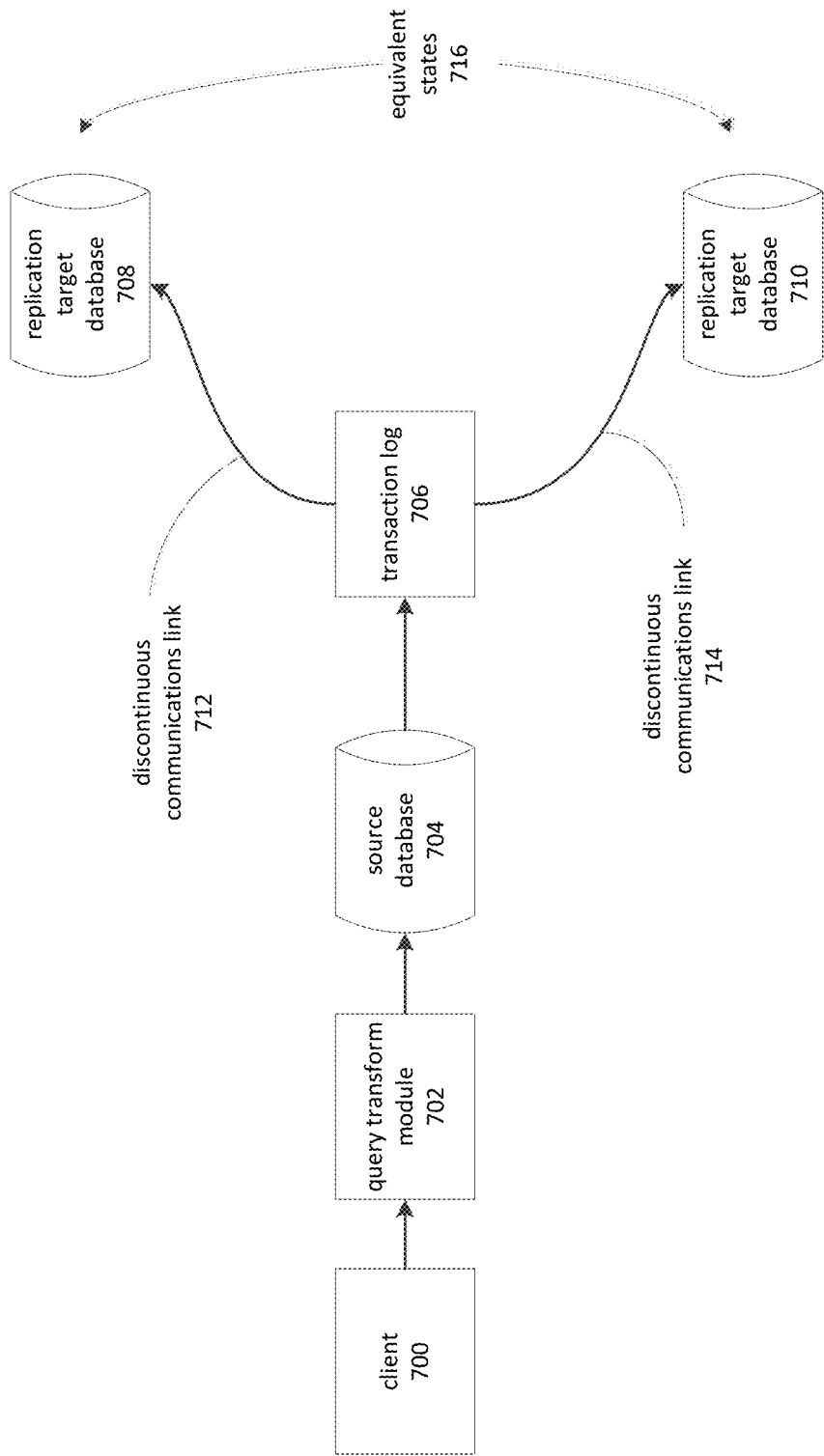
FIG. 7 is a block diagram depicting an example of replication over discontinuous communications links.

In an example, a query transform module may generate deterministic versions of non-deterministic queries, such that the rewritten queries may be replicated over discontinuous communications links without introducing non-deterministic artifacts into the replicated data. FIG. 7 is a block diagram depicting an example of replication over discontinuous communications links.

As depicted in FIG. 7, a client 700 may send a request to execute a query to a source database 704. The request may be processed by a query transform module 702. In some instances, the query transform module 702 may act as an intermediary between the client 700 and the source database 704, intercepting the request issued by the client 700. In other instances, the query transform module 702 may be integrated component into the source database 704. For example, the query transform module 702 may be integrated into a query analyzer or query optimizer stage of a database execution engine.

The source database 704 may execute a deterministic version of the submitted query. In so doing, the source database 704 may transition from an initial state prior to execution of the query to a subsequent state following execution of the query. A record describing the query may be stored in a transaction log 706. In an example, the record may comprise the text of the rewritten query, a plan for executing the rewritten query, or an encoded version of the rewritten query. In another example, the record may comprise a description of the state transition from the initial state to the subsequent state.

There may be some number of replication target databases 708, 710 which are to receive replicated data from the source database 704. There may be a replication process between the source database 704 and the replication target databases 708, 710 by way of discontinuous communications links 712, 714. The replication process may comprise occasional transmission of information from the transaction log 706 to the replication target databases 708, 710 over the discontinuous communications links 712, 714.

Note that the communications links 712, 714 are described as discontinuous not because they are necessarily intermitted, but because in the example provided by FIG. 7 the replication process performed over the communications links 712, 714 may be periodically interrupted for any number of reasons. For example, the replication target database 708 might normally operate independently, without replicating source database 704, and only occasionally perform replication on an ad hoc basis.

In an example, the initial state of source database may refer to the state of a set of data pertinent to one or more rewritten queries to be executed on the source database 704. The source database 704 may process rewritten queries directed towards this particular set of data. The replication target databases 708, 710 might meanwhile process other queries not pertinent to the particular set of data. At some time later, the rewritten queries might be executed on replication target databases 708 and 710 in order to produce, in each of the databases, equivalent states 716 with respect to the particular set of data. These states may be the same as the corresponding state of the source database 704 with respect to the particular dataset. This may be the case even though many non-state related conditions may have changed since the rewritten queries were executed on the source database, and even when a first replication target database 708 does not perform the replication at the same time as the other replication target database 710.

This approach to replication may be enabled using aspects of the present disclosure to rewrite non-deterministic queries as deterministic. Conventional replication techniques may involve continuous or at least sequential transmission of replication data. Moreover, even when this is done, the replicated data may in some cases result in an inexact copy due to the non-deterministic results produced by certain queries and portions of queries. In some instances, non-deterministic effects on database state may be compounded by previous non-deterministic effects, resulting in potentially significant differences in database state. These effects may be further compounded when replication is performed intermittently. However, these effects may be reduced using aspects of the present disclosure.

Figure 8:
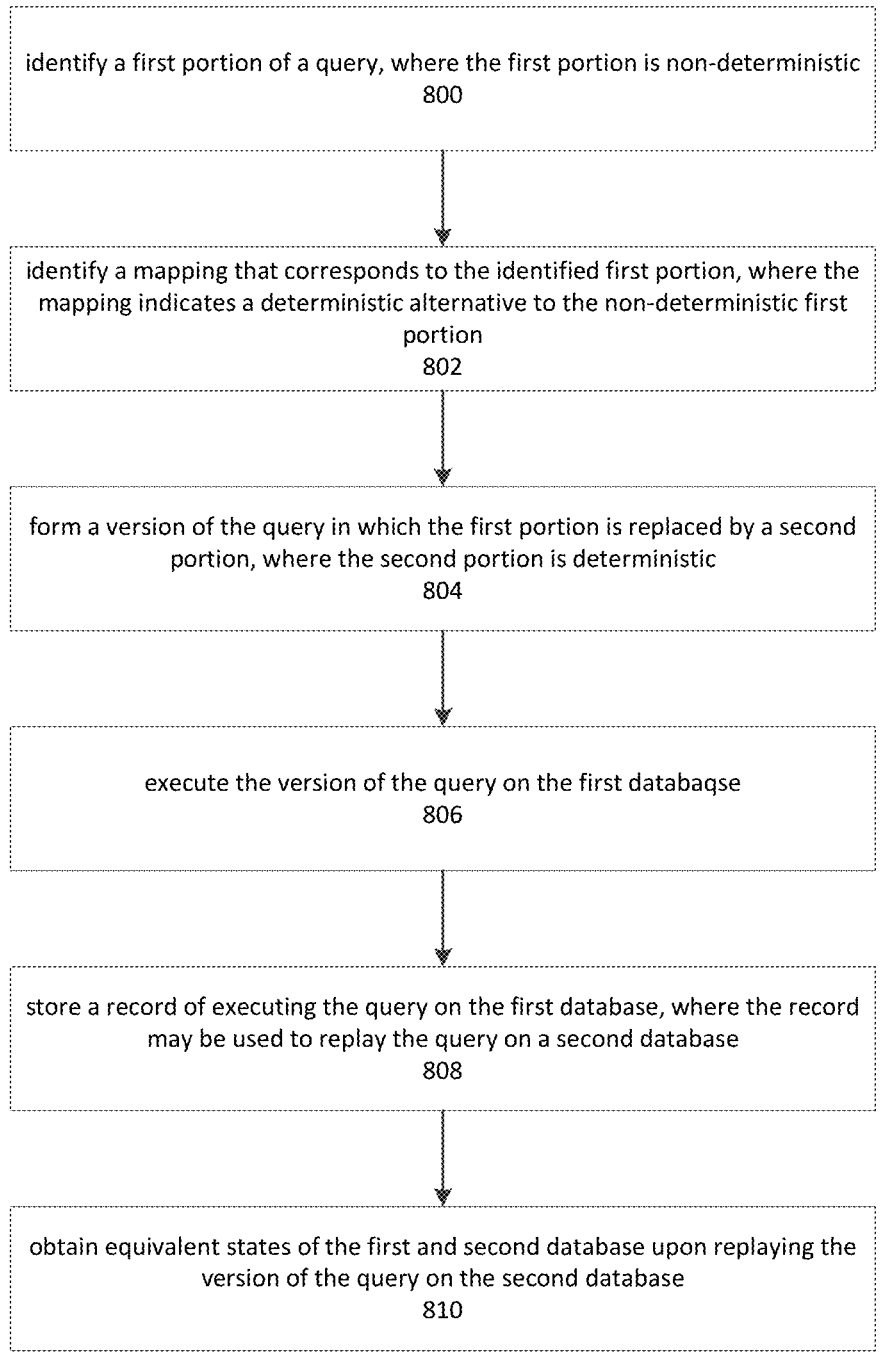
FIG. 8 is a flow diagram depicting an example process for forming a deterministic query from a non-deterministic query.

FIG. 8 is a flow diagram depicting an example process for forming a deterministic query from a non-deterministic query. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel. Embodiments of the depicted process may be implemented using various combinations of computer-executable instructions executed by a computing system, such as the computing systems described herein.

Block 800 depicts identifying a first portion of a query that is non-deterministic. This may, for example, involve receiving a database query, parsing it, and constructing a query plan corresponding to instructions for executing the query. The identification of the non-deterministic first portion may also comprise locating an operation in the query plan that is associated with non-determinism. For example, operations in the query plan may be compared to a list of operations known to be non-deterministic, or which may under some circumstances be non-deterministic. In some instances, further analysis of the context in which an operation is performed may be done to determine if an operation is non-deterministic, or to determine that an operation is "acceptably" deterministic. For example, a function call for outputting debugging information may be non-deterministic, but may be treated as deterministic since the non-determinism of debugging output may not be seen as significant.

Block 802 depicts identifying a mapping from the non-deterministic first portion of the query to information indicative of a strategy for replacing the non-deterministic first portion of the query with a second, deterministic portion. For example, a mapping may comprise information indicating that a call to a non-deterministic function should be replaced with a constant value, and information indicating how that constant value may be obtained.

As depicted by block 804, the mapping may be used to form a version of the query in which the first, non-deterministic portion of the query has been replaced by a second portion that is deterministic.

The deterministic version of the query may be executed on a first database, as depicted by block 806. Upon execution, the first database may transition from an initial state to a second state based upon execution of the query. Because the executed version of the query is deterministic, the second state is determined based upon the query and the initial state, without depending on other factors. Note that if the executed query was non-deterministic, the second state would be based not only on the query and the initial state, but also on other factors not included in the initial state.

Information indicative of the executed version of the query may then, as depicted by block 808, be stored in a log file, trace file, or another storage mechanism. The information may be used to subsequently replay the query on a second database. The information may comprise the text of the rewritten query, a query plan corresponding to the rewritten query, or data indicative of the state change caused by the query.

As depicted by block 810, equivalent states of a first and second database may be obtained by replaying the version of the query on the second database. The equivalent states may correspond to data pertinent to the query being the same on both the first and second databases after the version of the query has been executed on both database. Data not pertinent to the query may be excluded from considerations of equivalency. Prior to execution of the query on the first and second databases, the initial state of each database may be equivalent, with respect to data pertinent to the query, on both databases.

In an example, portions of a query that are incompatible with a replication target may be replaced with compatible portions. The portions may be replaced using those described herein with respect to replacing non-deterministic portions of a query. In a further example, non-deterministic portions of a query, as well as incompatible portions, may be replaced with deterministic portions and compatible portions. This may allow the reformed query to be executed on a target database that is of a different type than the source database. In a further example, data may be replicated between databases of different types by executing the reformed query on the second database. The source and target databases may enter the same final state, from equivalent initial states, based on execution of the reformed query.

Figure 9:
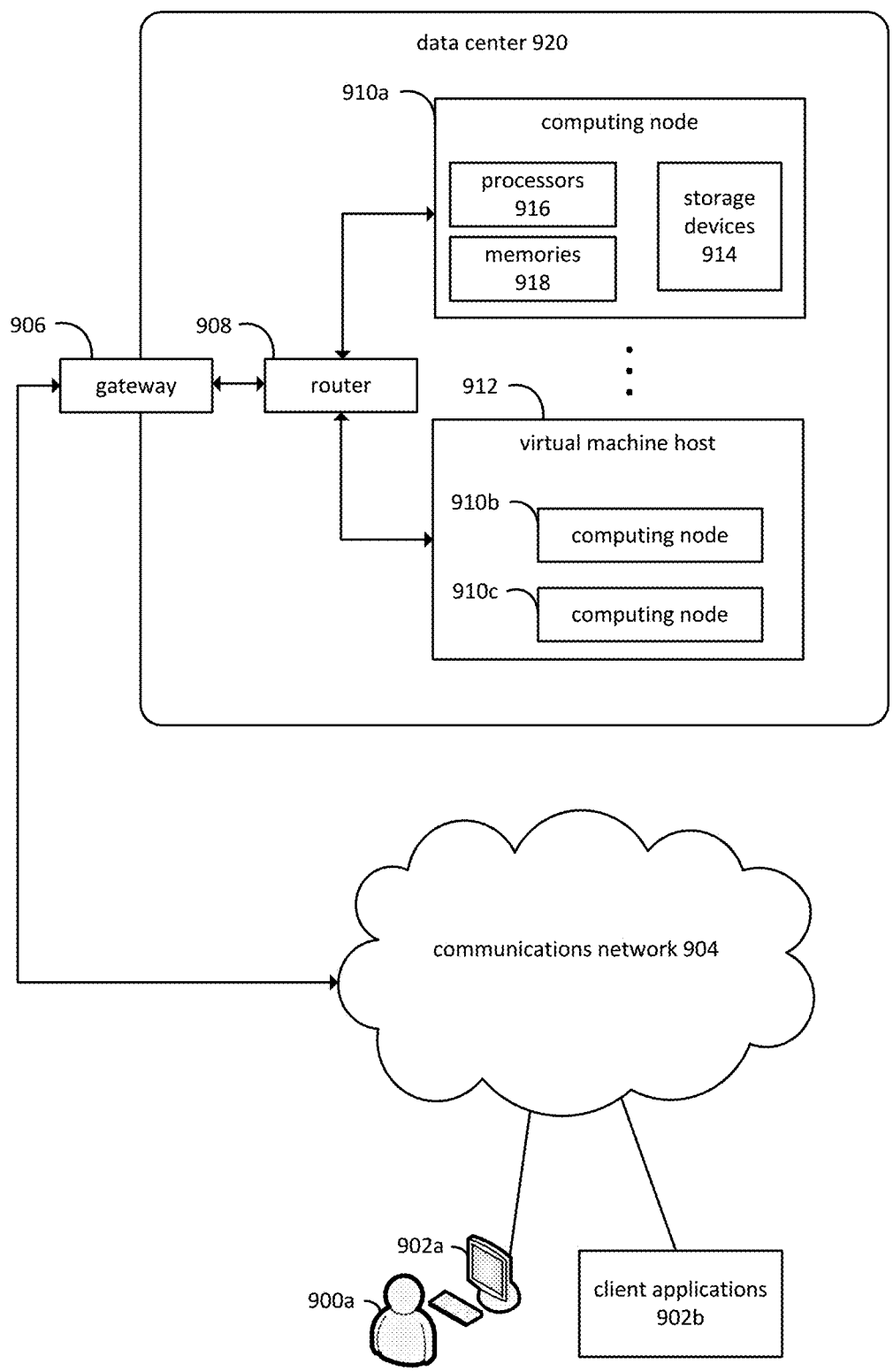
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b, and 910c within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a, 910b, and 910c, operating within data center 920, may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910a, 910b, and 910c. Some of these intermediate layers may themselves comprise processes executing on one or more of the computing nodes. Computing nodes 910a, 910b, and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918, and one or more storage devices 914. Processes on computing node 910a may execute in conjunction with an operating system or alternatively may execute as a bare-metal process that directly interacts with physical resources, such as processors 816, memories 918, or storage devices 914.

Computing nodes 910b and 910c are depicted as operating on virtual machine host 912, which may provide shared access to various physical resources, such as physical processors, memory, and storage devices. Any number of virtualization mechanisms might be employed to host the computing nodes.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 10:
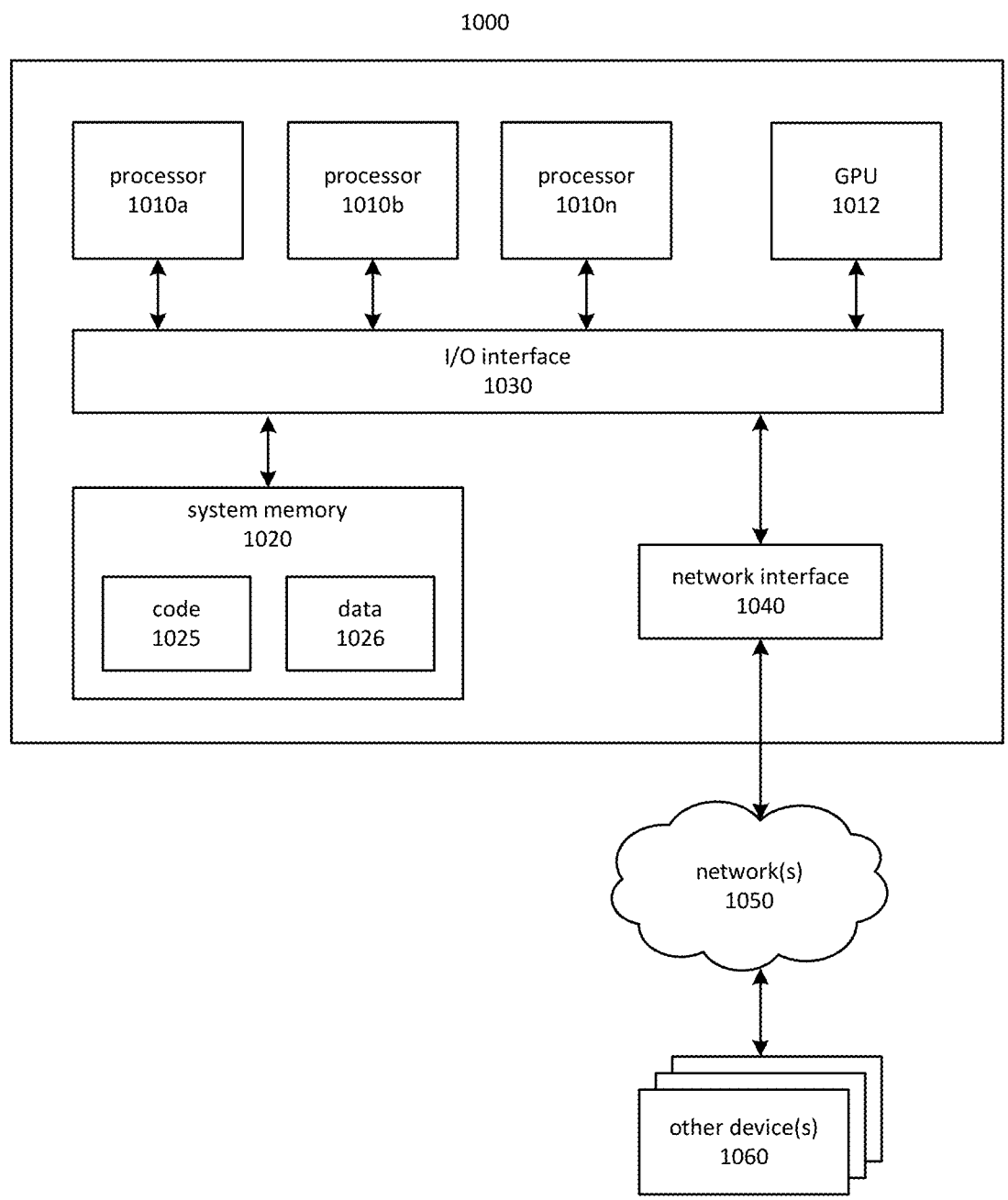
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
a first database; and
a computing node, comprising at least one processor and at least one memory, that at least:
parses a query of the first database to identify one or more portions of the query;
identifies a first portion of the one or more portions of the query, wherein executing the first portion of the query is related with a non-deterministic result that would not necessarily be a same result each time the first portion of the query is executed on a particular state of the first database;
selects a mapping comprising information indicative of a replacement for the first portion of the query;
forms a version of the query by at least replacing the first portion of the query with a second portion based at least in part on the mapping, wherein the second portion, upon execution, does not cause the non-deterministic result to be associated with executing the version of the query;
executes the version of the query, wherein the executing the version of the query causes the first database to transition from a first state to a second state; and
stores a record indicative of the executing the version of the query, wherein a second database in a state equivalent to the first state, upon execution of the version of the query based at least in part on the record, enters a state equivalent to the second state.

2. The system of claim 1, wherein the computing node at least:
identifies the first portion of the query by at least comparing an element of the first portion of the query to an entry in a list of non-deterministic functions.

3. The system of claim 1, wherein the mapping comprises information indicative of replacing the first portion of the query with at least one of a constant value or a deterministic function.

4. The system of claim 1, wherein the second portion comprises a constant value based at least in part on executing the first portion of the query on the first database.

5. A method, comprising:
identifying, by a computing node that includes a processor, a first portion of a query, wherein the first portion of the query is determined to be related with a non-deterministic result that would not necessarily be a same result each time the first portion of the query is executed on a particular state of a first database;
forming, by the computing node, a second query based at least in part on replacing the first portion of the query with a second portion, wherein the second portion, upon execution of the second query, is unassociated with the non-deterministic result, wherein the second portion is based at least in part on a mapping from the identified first portion of the query to information indicative of a replacement for the first portion of the query;
executing the second query on the first database, the first database transitioning from a first state to a second state upon the execution of the second query; and
storing, by the computing node, a record indicative of the second query, wherein the second query, when executed on a second database, causes the second database to transition from the first state to the second state.

6. The method of claim 5, wherein the second state is determined only by execution of the second query.

7. The method of claim 5, further comprising:
identifying the first portion of the query by at least comparing the first portion to entries in a list of non-deterministic functions.

8. The method of claim 5, further comprising:
replacing the first portion of the query with a deterministic function.

9. The method of claim 5, further comprising:
replacing the first portion of the query with a constant value.

10. The method of claim 9, wherein the constant value is based at least in part on executing the first portion of the query, wherein the first portion of the query is executed on at least one of the first database or the computing node.

11. The method of claim 9, wherein the constant value is based at least in part on approximating a result of executing the first portion of the query.

12. The method of claim 5, further comprising:
forming a query plan comprising a plurality of instructions for executing the query on the first database;
identifying an instruction, of the plurality of instructions, whose results upon execution are non-deterministic; and
identifying the first portion of the query based at least in part on the first portion corresponding to the instruction.

13. The method of claim 5, further comprising:
replicating data between the first database and a second database over an intermittent connection, wherein the second database transitions from the first state to the second state upon executing the second query, based on the record, after an outage of the intermittent connection.

14. A non-transitory computer-readable storage medium having stored thereon instructions that, upon execution by one or more computing devices, cause the one or more computing devices at least to:
identify a first portion of a query, wherein the first portion of the query is related with a non-deterministic result of the first portion of the query upon execution of the first portion of the query, wherein the non-deterministic result would not necessarily be a same result each time the first portion of the query is executed on a particular state of a first database;
map from the identified first portion of the query to information indicative of a replacement for the first portion of the query;
form a second query based at least in part on replacing the first portion of the query with a second portion, wherein the second portion is based at least in part on the information indicative of the replacement for the first portion of the query and the second portion, upon execution of the second query, is unassociated with the non-deterministic result;
execute the second query on the first database, the first database transitioning from a first state to a second state upon the execution of the second query; and
store a record indicative of the executing the second query on the first database, the record replayable on a second database to cause the second database to transition from the first state to the second state.

15. The non-transitory computer-readable storage medium of claim 14, further comprising instructions that, upon execution by the one or more computing devices, cause the one or more computing devices to at least:
identify the first portion of the query by at least comparing the first portion to entries in a list of non-deterministic functions.

16. The non-transitory computer-readable storage medium of claim 14, further comprising instructions that, upon execution by the one or more computing devices, cause the one or more computing devices to at least:
replace the first portion of the query with a user-defined function.

17. The non-transitory computer-readable storage medium of claim 14, wherein the first portion comprises at least one of a non-deterministic function, a non-deterministic clause, a non-deterministic statement, or a stored procedure.

18. The non-transitory computer-readable storage medium of claim 14, further comprising instructions that, upon execution by the one or more computing devices, cause the one or more computing devices to at least:
form the second query based at least in part on a mapping between operations of a query plan and statements compatible with a target database engine.

19. The non-transitory computer-readable storage medium of claim 14, further comprising instructions that, upon execution by the one or more computing devices, cause the one or more computing devices to at least:
replicate data between the first database and a second database, wherein the first database and the second database are of different types, wherein the second database transitions from the first state to the second state upon executing the second query based on the record.

* * * * *